(12) United States Patent
Brenner et al.

(10) Patent No.: US 11,953,109 B2
(45) Date of Patent: Apr. 9, 2024

(54) SAFETY VALVE DEVICE

(71) Applicant: Festo SE & Co. KG, Esslingen (DE)

(72) Inventors: Jakob Brenner, Esslingen (DE); Robert Rentz, Stuttgart (DE)

(73) Assignee: Festo SE & Co. KG, Esslingen (DE)

( * ) Notice: Subject to any disclaimer, the term of this patent is extended or adjusted under 35 U.S.C. 154(b) by 0 days.

(21) Appl. No.: 18/057,828

(22) Filed: Nov. 22, 2022

(65) Prior Publication Data

US 2023/0167914 A1    Jun. 1, 2023

(30) Foreign Application Priority Data

Nov. 30, 2021    (DE) .................. 10 2021 213 469.6

(51) Int. Cl.
*F16K 17/04* (2006.01)
*F16K 11/04* (2006.01)
*F16K 11/22* (2006.01)
*F15B 20/00* (2006.01)

(52) U.S. Cl.
CPC .......... *F16K 17/0473* (2013.01); *F16K 11/04* (2013.01); *F16K 11/22* (2013.01); *F15B 20/00* (2013.01)

(58) Field of Classification Search
CPC .. F16K 17/0473; F16K 11/042; F16K 11/044; F15B 20/00
See application file for complete search history.

(56) References Cited

U.S. PATENT DOCUMENTS

| | | | | |
|---|---|---|---|---|
| 3,411,411 A | * | 11/1968 | Fleck | F15B 18/00 91/1 |
| 4,718,451 A | * | 1/1988 | Kosugi | F15B 13/0814 137/884 |
| 10,234,045 B2 | | 3/2019 | Ballenger | |
| 10,429,865 B2 | * | 10/2019 | Ono | F16K 11/22 |
| 2014/0261709 A1 | | 9/2014 | Frazier | |

FOREIGN PATENT DOCUMENTS

DE    19909920 A1    9/2000

* cited by examiner

*Primary Examiner* — Michael R Reid
(74) *Attorney, Agent, or Firm* — The Webb Law Firm (57) ABSTRACT

A safety valve which has two fluidically interconnected safety valves, each of which has a 4/2-way valve function. Each safety valve has a first connecting port and a second connecting port, which are connected to each other in such a way that a fluid flow through the two safety valves, controlled by means of a control valve, to a fluid-actuated drive is prevented if the two safety valves simultaneously adopt a first switching position and such a fluid flow is possible if both valves simultaneously have a second switching state. One safety aspect results from the fact that the above-mentioned fluid flow is also prevented if the two safety valves adopt different switching states.

17 Claims, 7 Drawing Sheets

SAFETY VALVE DEVICE

CROSS-REFERENCE TO RELATED APPLICATION

This application claims priority to German Patent Application No. 10 2021 213 469.6 filed Nov. 30, 2021, the disclosure of which is hereby incorporated by reference in its entirety.

BACKGROUND

Field

The invention relates to a safety valve device having a first safety valve and a second safety valve fluidically interconnected with the first safety valve, wherein each safety valve has an actuating device by means of which it can optionally be moved into a first switching state or a second switching state.

Description of Related Art

Such a safety valve device is described in DE 199 09 920 A1 in the context of actuating a pneumatic motor and contains two fluidically interconnected, electrically actuable safety valves designed as 5/3-way valves. The safety valves have a safety function in disconnecting and reconnecting pneumatic energy, the series connection of the safety valves providing a redundancy of the safety function.

From US 2014/0261709 A1 a valve device is known which has a valve assembly and a soft-start valve connected to the valve assembly, the valve assembly having two 5/3-way valves among other components.

From U.S. Pat. No. 10,234,045 B2 a five-way poppet valve is known which has a valve member with several valve discs, a centred middle position being predetermined by a spring.

SUMMARY

The invention is based on the problem of creating a safety valve device that facilitates a safe operation of a fluid-actuated double-acting drive.

To solve this problem, it is provided in a safety valve device mentioned at the beginning, that both safety valves have a 4/2-way valve function, each of them having four valve ports, these being an inlet port designed for fluidic connection to a control valve controlling the feed and discharge of a working fluid, an outlet port designed for fluidic connection to a double-acting, fluid-actuated drive, and a first connecting port as well as a second connecting port, wherein the first connecting port of the first safety valve is fluidically connected to the second connecting port of the second safety valve and the first connecting port of the second safety valve is fluidically connected to the second connecting port of the first safety valve, wherein each safety valve has a valve housing in which is formed a valve member receptacle space extending in a longitudinal direction along a longitudinal axis, in which receptacle space a valve member movable between a closed position defining the first switching state and an open position defining the second switching state while performing a switchover movement in the longitudinal direction is located, wherein in each safety valve all valve ports are disconnected from one another in a fluid-tight manner in the closed position of the valve member and the inlet port is fluidically connected to the first connecting port and the second connecting port is fluidically connected to the outlet port in the open position of the valve member, wherein each safety valve has a first control structure for optionally blocking or enabling a fluid connection between the inlet port and the first connecting port and a second control structure located at a distance from the first control structure in the longitudinal direction for optionally blocking or enabling a fluid connection between the second connecting port and the outlet port, wherein each first control structure has a first control section formed at the valve member of the associated safety valve and having an annular first seal as well as an annular first valve seat formed at the valve housing, and wherein each second control structure has a second control section formed at the valve member of the associated safety valve and having an annular second seal as well as an annular second valve seat formed at the valve housing, wherein each valve member bears in its closed position with the first seal against the first valve seat and with the second seal against the second valve seat while forming a seal, and wherein each valve member is in its open position removed with the first seal from the first valve seat and with the second seal from the second valve seat, in each case opening up a flow cross-section, wherein the second control section having the second seal is in each valve member a part of an axial outlet end section of the valve member which, in the open position of the valve member, extends, without sealing contact to the valve housing, into a receptacle space end section of the valve member receptacle space and terminates in said receptacle space end section, the outlet port opening out into the receptacle space end section.

As core components the safety valve device according to the invention has two safety valves, each with a 4/2-way valve function, which are fluidically coupled to each other in a special way, so that a feed and discharge of a working fluid to and from a double-acting fluid-actuated drive connected to the outlet side, controlled by a control valve connected to the inlet side, is only possible if both safety valves are in their second switching state defined by the open position of the respectively associated valve member. In the open position of the valve member, in each safety valve—without any other fluid connection—the inlet port is fluidically connected to the first connecting port and the second connecting port is fluidically connected to the outlet port in order to facilitate a fluid transfer. Depending on the switching position of the control valve connected to the inlet side, the connected drive can therefore, if the safety valves simultaneously adopt the second switching state, be activated fluidically in such a way that its output member is subjected to a fluidic actuating force causing a stroking movement in one or the other direction. If functioning properly, both safety valves can simultaneously be moved into a first switching state, in which the associated valve member adopts a closed position interrupting the above-mentioned fluid connections between the above four valve ports. This prevents a further fluidic activation of the drive by the upstream control valve, and the output member of the drive is or remains stopped, because the two outlet ports communicating with the drive are blocked. According to the invention a safety function is provided by such a redundancy of the two safety valves that the two outlet ports are or remain blocked by virtue of the special fluidic interconnection of the safety valves even if the two safety valves are in different switching states, the one safety valve having the first switching state and the second safety valve having the second switching state. Even in these cases a fluidic activation of the drive by the upstream control valve is therefore not possible. At the same time hazardous situations can be avoided because the output member of the drive cannot move in an uncontrolled fashion. The safety valve device permits a simple system diagnosis because functionality can easily be verified by the fact that the output member of the connected drive cannot be moved if the safety valves are in different switching states.

Each safety valve has a first control structure for controlling the fluid connection between the inlet port and the first connecting port and a second control structure for controlling the fluid connection between the second connecting port and the outlet port. Each control structure has a respective first or second control section formed at the associated valve member with a respective first or second seal which can interact with a respective annular first or second valve seat at the valve housing. Each valve member extends in a valve member receptacle space, having a longitudinal extent, of the associated valve housing and has two axial end sections opposite each other. One of said axial end sections, which is described as outlet end section for better differentiation, extends into a reception space end section of the valve member receptacle space, which communicates with the outlet port of the safety valve concerned. A special safety aspect arises from the fact that the second control section equipped with the second seal is a part of the outlet end section of the valve member which, in the open position of the valve member, extends into the receptacle space end section communicating with the outlet port and terminates therein without any sealing contact between it and the valve housing. In particular, there is no dynamic sealing point, possibly subject to leakage, between the outlet end section of the valve member and the valve housing if the valve member is in the open position. In this switching state there can accordingly be no seal failure leading to malfunction.

Advantageous further developments of the invention emerge from the dependent claims.

The two safety valves are expediently designed as monostable valves, each having a return spring preloading the valve member into the closed position. The closed position thus corresponds to an inoperative position prevailing if the safety valves have not been actuated. This ensures that, when the safety device is put into operation, the fluid connection to the connected drive is interrupted and the drive cannot perform any uncontrolled actions.

In each safety valve the return spring is expediently located in the receptacle space end section of the valve member receptacle space. There it is supported at the valve member at one end and at the valve housing at the other end. The return spring is a compression spring in particular, preferably a helical compression spring.

Although a lateral termination into the receptacle space end section can be realised in principle, it is advantageous if each outlet port terminates axially into the associated receptacle space end section in coaxial orientation with respect to the longitudinal axis.

The actuating devices of the two safety valves are expediently of an electrically actuable design. The actuating devices are preferably designed as electrically actuable pilot valves, so that the safety valves are electro-fluidically pilot-controlled directional valves, an electro-pneumatic pilot control being preferred. In principle, however, the safety valves could also be directly actuated electrically, for example by designing the actuating device as a solenoid the movable armature of which is motion-coupled to the valve member.

Of the two control structures of each safety valve, at least the second control structure is expediently designed as a poppet valve structure the second valve seat of which is oriented axially, i.e. in the longitudinal direction of the valve member receptacle space, and faces the receptacle space end section. In this case the second control section is always within the receptacle space end section irrespective of the switching position of the valve member, wherein a second seal located axially opposite the second valve seat axially bears against the second valve seat in the closed position and is axially lifted off the second valve seat in the open position. Such a poppet valve structure has the advantage that any pressure peaks occurring when the output member of the activated drive is stopped abruptly by external resistances are caught by the axial second valve seat. The high fluid pressure developing in this case temporarily in the receptacle space end section pushes the second control section more strongly against the opposite second valve seat, thereby eliminating malfunctions.

The first control structure can also be designed as a poppet valve structure. To avoid over-determination, however, it is advantageous if it is designed as a spool valve structure as usually found in so-called spool valves. In this case the first control structure has a second valve seat which is oriented radially inwards with respect to the longitudinal axis of the valve member receptacle space and against which the first seal of the first control section of the valve member bears radially from a radially inward direction in the closed position of the valve member.

Irrespective of the above-mentioned preferred combination of first and second control structures, it is advantageous if each outlet port terminates into the associated receptacle space end section axially with a coaxial orientation with respect to the longitudinal axis.

In each safety valve the valve member receptacle space accommodating the valve member is bounded by a peripheral receptacle space boundary surface of the valve housing radially on the outside. It is deemed beneficial if the valve member receptacle space is divided into several receptacle space main sections arranged consecutively in the longitudinal direction at a distance from one another and several receptacle space transition sections, each located between two longitudinally consecutive receptacle space main sections, the receptacle space transition sections having a smaller cross-section that the receptacle space main sections. The first valve seat belonging to the first control structure is located at a first receptacle space transition section, while the second valve seat belonging to the second control structure is formed at a second receptacle space transition section. The receptacle space main section adjoining the second receptacle space transition section forms the receptacle space end section into which an outlet port terminates.

Depending on whether the respective control structure is designed as a poppet valve structure or as a spool valve structure, the associated annular valve seat is formed at the respective receptacle space transition section with axial orientation or with radial orientation.

In each of the two safety valves preferably designed as 4/2-way valves, it is expedient if the receptacle space main sections have in the longitudinal direction of the valve member receptacle space consecutively an inlet main section, a first connecting main section, a second connecting main section and an outlet main section represented by the receptacle space end section. Between the inlet main section and the first connecting main section, the first receptacle space transition section is located, while the second receptacle space transition section is located between the second connecting main section and the outlet main section. In each safety valve the inlet port terminates into the inlet main section, the first connecting port into the first connecting main section, the second connecting port into the second connecting main section and the outlet port into the outlet main section. A third receptacle space transition section is located between the first connecting main section and the second connecting main section, wherein the valve member is in sealing contact with the third receptacle space transition section irrespective of its switching position, so that the first connecting main section and the second connecting main section are always tightly sealed against each other within the valve member receptacle space.

Between the valve member and the third receptacle space transition section, there is preferably used a dynamic sealing arrangement in the manner of a valve spool principle. In this case the third receptacle space is radially outside bounded by a hollow-cylindrical surface section of the peripheral receptacle space boundary surface of the valve housing, against which the valve member always bears with an annular third seal in sealing contact in a slidable manner.

The inlet main section of the valve member receptacle space is preferably sealed dynamically at the outside axially opposite the first receptacle space transition section by means of a dynamic sealing arrangement realised between the valve member and the valve housing independently of switching position. For this purpose it can in particular be provided that the valve member has an annular end seal bearing against a hollow-cylindrical surface section of the peripheral receptacle space boundary surface.

To realise the safety valve device, the two safety valves can be designed as individual valves, wherein the connection between the individual connecting ports can be realised by means of suitable fluid lines, for example by means of compressed air hoses to realise the circuit responsible for the safety function. A design is preferred, however, in which the two safety valves are combined to form a safety valve unit capable of uniform handling. In this the valve houses of the two safety valves are represented by sections of a valve housing unit of the safety valve unit, wherein all valve ports of both safety valves are formed.

The two safety valves are preferably placed next to each other longitudinally in the safety valve unit and oriented such that their receptacle space end sections, communicating with an outlet port each, point into the same axial direction.

For fluidic interconnection, the connecting ports of the two safety valves are connected to each other with correct assignment by means of a first connecting passage and a second connecting passage, said two connecting passages being formed in the valve housing unit.

For a preferred application the safety valve device contains a control valve designed as a five-way valve, which has two working passages, the first of which is connected to the inlet port of the first safety valve and the other is connected to the inlet port of the second safety valve. The control valve further has a feed passage connected to a pressure source providing the working fluid and two venting passages connected to a pressure sink, in particular to atmosphere. The control valve is for example designed as a 5/3-way valve and preferably as a 5/2-way valve. The control valve can also be described as a directional control valve, because the direction of movement of the output member of the fluid-actuated drive connected to the two safety valves can be predetermined therewith.

The safety valve is expediently equipped with an electronic control unit to which the actuating devices of the two safety valves are connected and which is capable of presetting the switching states of the two safety valves. The optional control valve is preferably also connected to the said electronic control unit.

BRIEF DESCRIPTION OF THE DRAWINGS

The invention is explained in greater detail below with reference to the enclosed drawing, in which.

DETAILED DESCRIPTION

The safety valve device given the reference number 6 as a whole contains a first safety valve V1 and a second safety valve V2, both of which have a 4/2-way valve function and are 4/2-way valves by way of example. The two safety valves V1, V2 are fluidically interconnected in a special way, which is realised by way of example by means of a first connecting passage VK1 and a second connecting passage VK2 in a way to be explained below.

The two safety valves V1, V2 are preferably actuable electrically, for which purpose the first safety valve V1 has an electric first actuating device B1 and the second safety valve V2 has an electric second actuating device B2. By means of the actuating devices B1, B2 each safety valve V1, V2 can optionally be moved into a first switching state or a second switching state. The electric activation of the actuating devices B1, B2 is performed by an electronic control unit 7, which is electrically connected to the two actuating devices B1, B2 and expediently is a part of the safety valve device 6.

The two safety valves V1, V2 are preferably monostable directional valves. In this context each has a return spring 8 preloading it into the first switching state, so that the first switching state defines an inoperative state in which the actuating device B1, B2 is electrically deactivated.

Each safety valve V1, V2 has a valve housing 11, 12, in which a valve member 13, 14 is located, wherein, for better differentiation, the valve member 13 of the first safety valve V1 is also described as first valve member 13 and the valve member 14 of the second safety valve V2 is also described as first valve member 14.

Each valve member 13, 14 can be driven to perform a linear reciprocating switchover movement 15 relative to the associated valve housing 11, 12, which is indicated by a double-headed arrow. By the switch-over movement 15 the valve member 13, 14 can optionally be positioned in a closed position determining the first switching state or in an open position determining the second switching state.

The switchover movement 15 is carried out in a longitudinal direction 16a, this being the axial direction of a longitudinal axis 16 of a valve member receptacle space 17, which is formed in each valve housing 11, 12 and in each of which one of the two valve members 13, 14 extends. Each valve member 13, 14 has an oblong shape with a round and in particular circular cross-section.

Each valve member 13, 14 axially has a first end section 18 and a second end section 19 opposite the former in the longitudinal direction 16a. The first end section 18 extends in a receptacle space end section 22 defining the one axial end of the valve member receptacle space 17, the first end section 18 terminating freely in said receptacle space end section 22. The return spring 8 is expediently located in said receptacle space end section 22, being designed as a compression spring and being supported at one end at the first end section 18 of the valve member 13, 14 and at the other end at an end wall 23 of a respective valve housing 11, 12 bounding the receptacle space end section 22 on the side axially opposite the valve member 13, 14.

Figure 2:
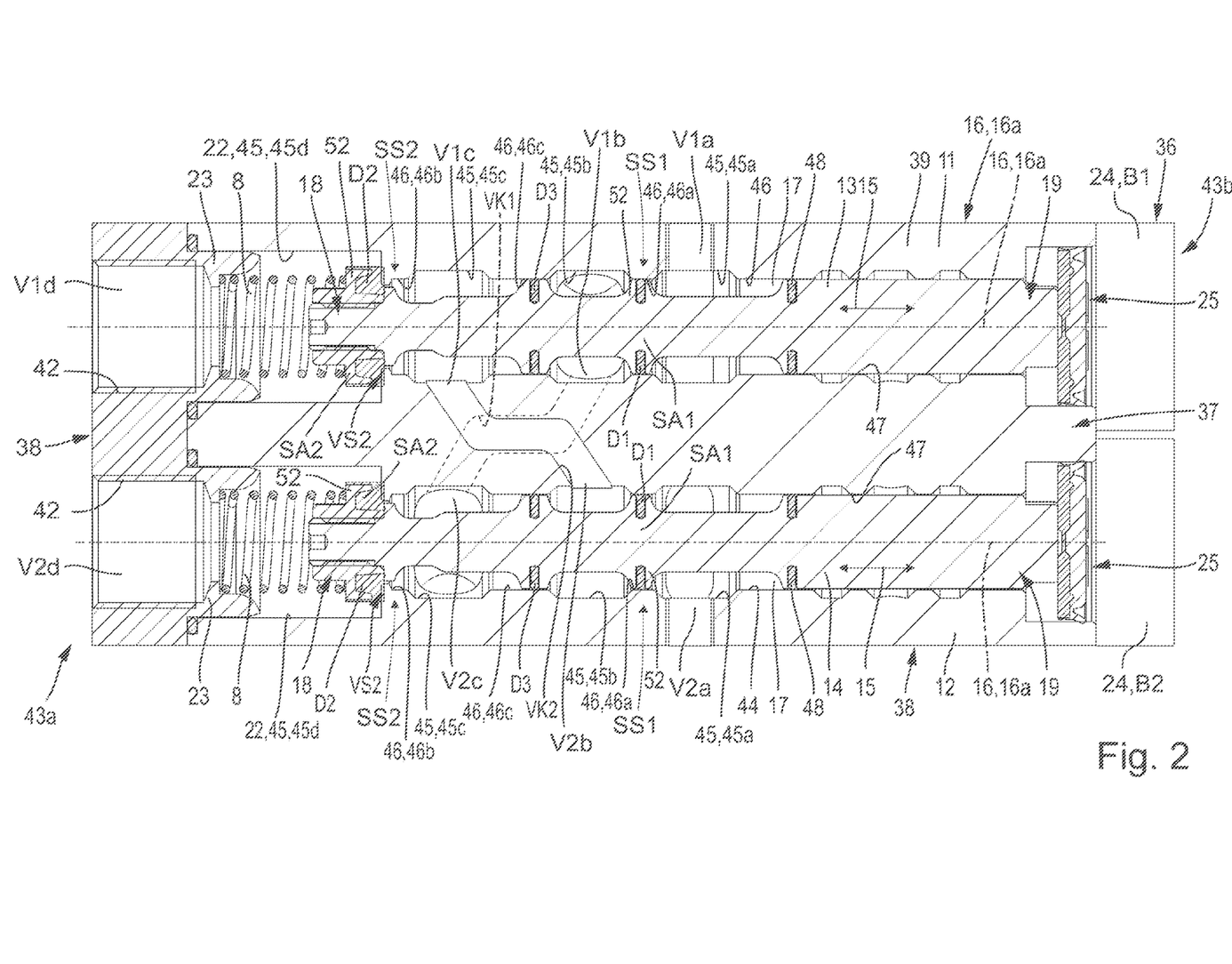
FIG. 2 shows a longitudinal section through a safety valve unit of preferred structure, wherein the two safety valves from FIG. 1 are combined to form a modular unit and contain the components contained in the rectangular frame in FIG. 1, both safety valves occupying their first switching state in accordance with FIG. 1.

By means of the return spring 8, which is preferably designed as a helical compression spring, the associated valve member 13, 14 is always pressurised towards the right in the sectional views of FIG. 2, FIG. 4, FIG. 6, FIG. 8 and FIG. 10 and resiliently preloaded into the closed position defining the first switching state seen in FIG. 2, for example.

By means of the actuating device B1, B2, a driving force can be applied to the respective valve member 13, 14 in a controlled manner, in order to relocate the latter from the closed position into the second switching state defining the open position or to permit its return into the closed position by the force of the return spring 8. The open position, in which the valve member 13, 14 has moved to the left in the sectional views of the drawing, can be seen in FIG. 4, for example.

The two actuating devices B1, B2 are preferably designed as electrically actuable pilot valve devices 24. With these the driving force required for switching over the valve member 13, 14 can be generated from a fluid power provided by a pilot fluid. Each valve member 13, 14 is preferably assigned in the region of the second end section 19 a drive surface 25 averted from the first end section 18, to which drive surface 25 pressure can optionally be applied by a pilot control fluid by the associated pilot valve device 24, or which can be relieved of pressure. The pilot valve devices 24 are solenoid valves in particular. The pilot control fluid is, by way of suitable passages, supplied in a way not shown in the drawing by an external pressure source P, in particular a compressed air source, which also supplies a working fluid under positive pressure, which is used to operate a double-acting fluid-actuated drive 26 connected to the outlet side of the two safety valves V1, V2.

The fluid-actuated drive 26 has a drive housing 27 and an output member 29, which can optionally be driven with respect to the former to perform a first working movement 28a or a second working movement 28b by the controlled application of the drive fluid mentioned above. The output member 29 divides the interior of the drive housing 27 into a first drive chamber 32a and a second drive chamber 32b, wherein the above-mentioned drive fluid can be applied to the two drive chambers 32a, 32b in a controlled manner in order to initiate the first or the second working movement 28a, 28b or to position the output member 29 optionally in a first stroke end position shown in FIG. 1 or in a second stroke end position opposite the former. In the first output movement 28a the output member 29 moves from the first stroke end position into the second stroke end position, in the second output movement 28b in the opposite direction.

The division into the two drive chambers 32a, 32b is preferably carried out by a piston section 29a of the output member 29. The output member 29 preferably also has a piston rod section 29b, which is located at the piston section 29a and projects from the drive housing 27 to facilitate a force take-off.

The movement and the direction of the output member 29 of the drive 26 are expediently controlled by a control valve SV located downstream on the inlet side of the safety valves V1, V2. By way of example the control valve SV is separate from the safety valve device 6, but it can easily be a part of the safety valve device 6.

In the illustrated embodiment the control valve SV is a five-way valve with five valve passages 1-5, the connection pattern of which can be changed depending on switching position. The valve passages 1-5 comprise a feed passage 1 connected to the pressure source P, two vent passages 3, 5, each connected to a pressure sink R, in particular the atmosphere, as well as a first working passage 2 and a second working passage 4.

The control valve SV preferably is a 5/2-way valve, which applies to the illustrated embodiment. The control valve SV is equipped with at least one electrically actuable valve drive device 33, which is expediently connected to the electronic control unit 7 for the reception of electric actuating signals, so that the control valve SV can alternatively be switched into a first switching position seen in FIG. 1, FIG. 3, FIG. 7 and FIG. 9 or into a second switching position shown in FIG. 2, FIG. 11 and FIG. 12.

In the first switching position the first working passage 2 is connected to the feed passage 1, while at the same time the second working passage 4 is connected to a pressure sink R via the one vent passage 5. In the second switching position the first working passage 2 is connected to the other vent passage 3 and thus likewise to a pressure sink R, while at the same time the second working passage 4 communicates with the feed passage 1 connected to the pressure source P.

The control valve SV could also be designed as a 5/3-way valve, having a further, third switching position in which both working passages 2, 4 are blocked.

The first safety valve V1 is provided with four valve ports V1a, V1b, V1c, V1d in its valve housing 11, while the second safety valve V2 likewise has four valve ports V2a, V2b, V2c, V2d in its valve housing 12.

The above-mentioned valve ports of the first safety valve V1 are an inlet port V1a, a first connecting port V1b, a second connecting port V1c and an outlet port V1d. The four valve ports of the second safety valve V2 are an inlet port V2a, a first connecting port V2b, a second connecting port V2c and an outlet port V2d. Via the above-mentioned first connecting passage VK1, the first connecting port V1b of the first safety valve V1 is always connected to the second connecting port V2c of the second safety valve V2. Via the above-mentioned second connecting passage VK2, the first connecting port V2b of the second safety valve V2 is always connected to the second connecting port V1c of the first safety valve V1.

The two inlet ports V1a, V2a are designed to feed and discharge the working fluid provided for operating the fluid-actuated drive 26, wherein the inlet port V1a of the first safety valve V1 is connected to the first working passage 2 of the control valve SV by way of example and the inlet port V2a of the second safety valve V2 to the second working passage 4 of the control valve SV by way of example. Suitable fluid lines 34 are expediently provided to realise these fluid connections.

The two outlet ports V1d, V2d are designed for connecting the fluid-actuated drive 26. Suitable fluid lines 35 are likewise provided for the fluid connection. By way of example the connecting system is designed such that the outlet port V1d of the first safety valve V1 communicates with the first drive chamber 32a and the outlet port V2d of the second safety valve V2 communicates with the second drive chamber 32b of the fluid-actuated drive 26.

The two safety valves V1, V2 can be contained in the safety valve device 6 as independent valves. However, the structure realised by way of example is preferred, in which the two safety valves V1, V2 are combined to form a safety valve unit 36 capable of uniform handling, which is illustrated in a preferred embodiment in longitudinal section in FIG. 2, FIG. 4, FIG. 6, FIG. 8 and FIG. 10 and visualised by means of a dot-dash rectangular frame in the illustrated circuits.

The two valve housings 11, 12 are expediently designed as at least partially one-piece sections of a valve housing unit 37 of the safety valve unit 36. All valve ports V1a, V1b, V1c, V1d, V2a, V2b, V2c, V2d are preferably located in the valve housing unit 37. The two connecting passages VK1, VK2 are formed in the inside of the valve housing unit 37, where the associated connecting ports V1b, V2b, V1c, V2c are located as well. Only the two inlet ports V1a, V2a and the two outlet ports V1d, V2d terminate towards the outer surface of the valve housing unit 37, so that they are accessible for connecting the fluid lines 34, 35 mentioned above. Each inlet port V1a, V2a and each outlet port V1d, V2d is assigned a fastening device 42 of any kind, which allows the releasable connection of the fluid lines 34, 35 and which has a fastening thread formed in the respective valve port V1a, V2a, V1d, V2d by way of example.

The two connecting passages VK1, VK2 are preferably formed in the valve housing unit 37, crossing each other without mutual connection. This is realised in the illustrated embodiment. The arrangement can therefore be described as a cross-over circuit of the passages.

The valve housing unit 37 preferably has a one-piece housing main body 39, in which the two valve member receptacle spaces 17 are formed with parallel orientation along each other and at the same axial level. They are oriented in such a way that the two receptacle space end sections 22 point in the same axial direction. In the region of a first end face 43a of the valve housing unit 37, the end wall 23 designed as a separate component is mounted on the housing main body 39. In the region of the second end face 43b axially opposite the first end face 43a, the actuating devices B1, B2 are mounted on the housing main body 39.

Each of the two valve member receptacle spaces 17 is bounded by a peripheral receptacle space boundary surface 44 of the associated valve housing 11, 12 radially on the outside In its longitudinal direction 16a, the valve member receptacle space 17 is divided into several receptacle space main sections 45 arranged consecutively at a distance from one another and several receptacle space transition sections 46, each located between two longitudinally consecutive receptacle space main sections 45; these merge axially into one another. The receptacle space transition sections 46 have a smaller cross-section than the receptacle space main sections 45.

One of the receptacle space main sections 45 is bounded by the end wall 23 and forms the receptacle space end section 22 mentioned above. The receptacle space transition sections 46 include a first receptacle space transition section 46a, a second receptacle space transition section 46b and a third receptacle space transition section 46c. The receptacle space main sections 45 of each valve member receptacle space 17 include, in addition to the receptacle space end section 22, an inlet main section 45a, a first connecting main section 45b and a second connecting main section 45c.

The receptacle space end section 22 is also described as outlet main section 45d of the valve member receptacle space 17, because the outlet port V1d, V2d of the associated safety valve V1, V2 terminates there. Each outlet port V1d, V2d is preferably designed such that it extends exclusively coaxially with the longitudinal axis 16 of the communicating valve member receptacle space 17 and terminates axially into the outlet main section 45d in coaxial orientation with respect to said longitudinal axis 16.

Each outlet port V1d, V2d preferably passes through the end wall 23 bounding the valve member receptacle space 17.

In each safety valve V1, V2 the various longitudinal sections of the valve member receptacle space 17, beginning with the outlet main section 45d, are arranged one behind the other in the following axial sequence: outlet main section 45d, second receptacle space transition section 46b, second connecting main section 45c, third receptacle space transition section 46c, first connecting main section 45b, first receptacle space transition section 46a and finally the inlet main section 45a.

In each safety valve V1, V2 the inlet port V1a, V2a terminates into the inlet main section 45a, the first connecting port V1b, V2b into the first connecting main section 45b, the second connecting port V1c, V2c into the second connecting main section 45c, and—as already mentioned—the outlet port V1d, V2d into the outlet main section 45d represented by the receptacle space end section 22.

The inlet main section 45a is followed in each safety valve V1, V2 in the direction towards the second end face 43b by a receptacle space longitudinal section 47 at the end, which is always sealed in a fluid-tight manner by a dynamic sealing arrangement by the associated valve member 13, 14, irrespective of its switching position. In this region the valve member 13, 14 has an annular end seal 48, which always bears radially against a hollow-cylindrical surface section of the receptacle space boundary surface in a slidable manner.

A permanent sealing contact between the valve member 13, 14 ant the receptacle space boundary surface 44 is also present in the third receptacle space transmission section 46c, which is likewise bounded by a hollow-cylindrical surface section of the peripheral receptacle space boundary surface 44 radially on the outside. By way of example the valve member 13, 14 has in the region of the third receptacle space transmission section 46c an annular seal described as third seal D3 for better differentiation, which always bears with sealing contact radially against the receptacle space boundary surface 44 in a slidable manner. In this way the first connecting main section 45b and the second connecting main section 45c are always disconnected from each other in a fluid-tight manner.

Each safety valve V1, V2 has a first control structure SS1 and a second control structure SS2 located at a distance therefrom in the direction towards the receptacle space end section 22. The first control structure SS1 is designed for optionally blocking or opening up a fluid connection between the inlet main section 45a communicating with the inlet port V1a, V2a and the first connecting main section 45b communicating with the first connecting port V1b, V2b. The second control structure SS2 is designed for optionally blocking or opening up a fluid connection between the second connecting main section 45b communicating with the second connecting port V1c, V2c and the outlet main section 45d communicating with the outlet port V1d, V2d. The switchover between blocking and opening up the fluid connection is in both control structures SS1, SS2 of the respective safety valve V1, V2 synchronous in the switchover movement 15 of the associated valve member 13, 14.

The control structures SS1, SS2 are in each safety valve V1, V2 designed such that in the closed position of the valve member 13, 14 all valve ports V1a, V1b, V1c, V1d; V2a, V2b, V2c, V2d are disconnected from one another in a fluid-tight manner, and in the open position of the valve member 13, 14 the inlet port V1a, V2a is fluidically connected to the first connecting port V1b, V2b and the second connecting port V1c, V2c is fluidically connected to the outlet port V1d, V2d. The fluidic connection is the result of the fact that the first and the second receptacle space transition section 46a, 46b are, in contrast to the closed position of the valve member 13, 14, not blocked, so that a fluid transfer is possible between the inlet port V1a, V1b and the first connecting port V1b, V2b on the one hand and between the second connecting port V1c, V2c and the outlet port V1d, V2d on the other hand.

The first control structure SS1 of each safety valve V1, V2 has a first control section SA1 formed at the associated valve member 13, 14. This first control section SA1 includes an annular first seal D1, which is coaxial with the longitudinal axis 16 and joins in the switchover movement 15. The first control structure SS1 further includes an annular first valve seat VS1, which is formed at the valve housing 11, 12 at the receptacle space boundary surface 44 and coaxial with the longitudinal axis 16.

The second control structure SS2 has a second control section SA2 formed at the valve member 13, 14, which includes an annular second seal D2, which is coaxial with the longitudinal axis 16 and joins in the switchover movement 15. The second control structure SS2 further contains an annular second valve seat VS2, which is formed at the receptacle space boundary surface 44 and coaxial with the longitudinal axis 16.

In its closed position each valve member 13, 14 bears against the first valve seat VS1 with the first seal D1 and at the same time against the second valve seat VS2 with the second seal D2 while forming a seal. In this way a fluid transfer through the respectively associated first or second receptacle space transition section 46a, 46b is prevented.

In the open position of the valve member 13, 14 the first seal D1 is removed from the first valve seat VS1 and at the same time the second seal D2 is removed from the second valve seat VS2. This opens up a previously blocked flow cross-section between the valve member 13, 14 and the receptacle space boundary surface 44 in the region of the respective receptacle space transition section 46a, 46b, thereby facilitating a fluid transfer.

Figure 4:
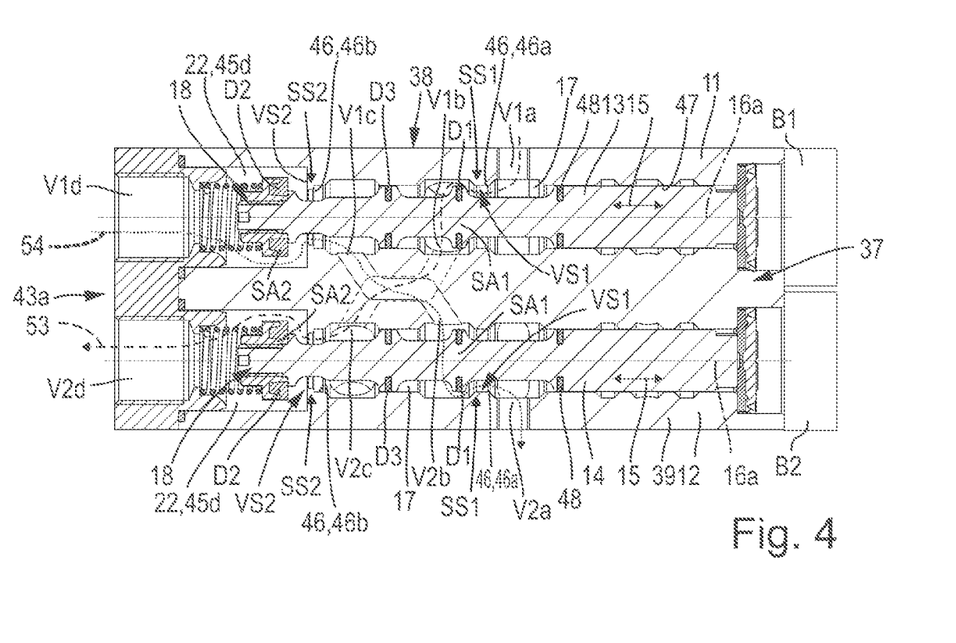
FIG. 4 shows the safety valve unit from FIG. 2 with both safety valves in their second switching state in accordance with FIG. 3.
Figure 6:
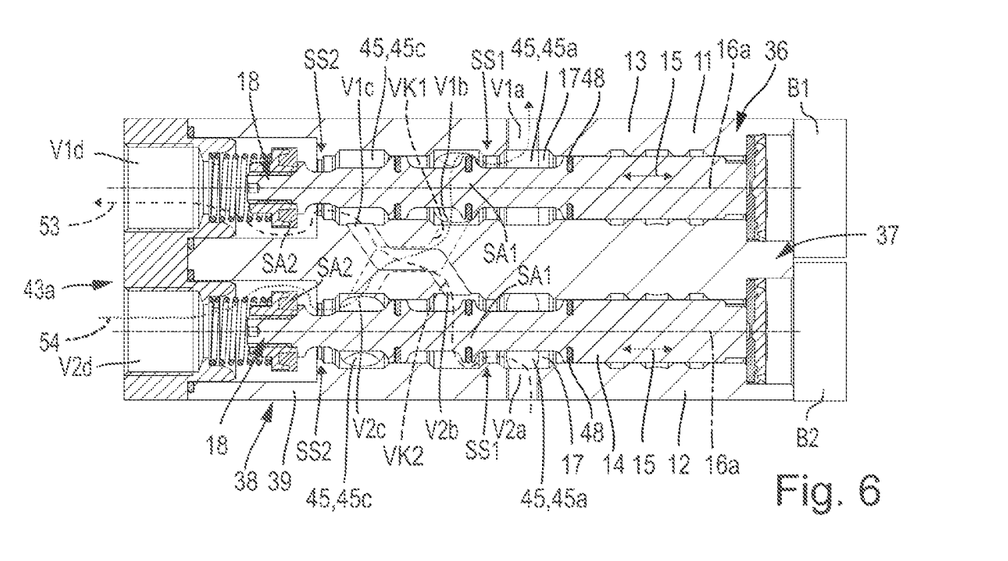
FIG. 6 shows the safety valve unit according to FIG. 2 and FIG. 4 with both safety valves in the second switching state in accordance with the circuit of FIG. 5, wherein, compared to the arrangement according to FIG. 3 and FIG. 4, only the flow direction of the working fluid in the control valves has changed owing to the changed switching position of the control valve.

In each valve member 13, 14 the second control section SA2 having the second seal D2 belongs to the first end section 18 of the valve member 13, 14, which terminates in the receptacle space end section 22 and, because of its assignment to the outlet port V1d, V2d, is also described as outlet end section 18 of the valve member 13, 14. In the open position of the valve member 13, 14 the outlet end section 18, including the associated second control section SA2, occupies a position within the receptacle space end section 22 without being in sealing contact with the valve housing 11, 12. FIG. 4 and FIG. 6 show flow arrows representing a flow of the working fluid in the open position of the valve members 13, 14; here it can be seen clearly that the drive fluid can pass the second control section SA2 freely radially on the outside in the axial direction.

Each control section SA1, SA2 preferably has an annular collar 52, which radially projects with respect to the axially adjacent sections of the valve member 13, 14 and where the associated first or second seal D1, D2 is fixed, in particular in a fixing groove. The annular collar 52 of the second control section SA2 preferably contains a nut screwed onto a one-piece base body of the valve member 13, 14.

The second control structure SS2 is preferably designed as a poppet valve structure, while the first control structure SS1 is designed as a spool valve structure. This applies to the illustrated embodiment. The poppet valve structure results from the fact that the second valve seat VS2 and the associated second seal D2 are located axially opposite each other in the longitudinal direction 16a, the second valve seat VS2 being formed with axial orientation at that end face of a housing section of the valve housing 11, 12 enclosing the second receptacle space transition section 46b which faces the receptacle space end section 22. In the closed position the second seal D2 axially bears against the facing second valve seat VS2, while being axially lifted off from said second valve seat VS2 in the open position.

The spool valve structure of the first control structure SS1 results from the fact that The first valve seat V1 is represented by that surface section of the receptacle space boundary surface 44 which points radially inwards and bounds the first receptacle space transition section 46a radially on the outside, the first seal D1 bearing against said first valve seat VS1 radially from the inside in the closed position. During the switchover between the open position and the closed position the first seal D1 slides along the first valve seat VS1. In the closed position it is within the first receptacle space transition section 46a and there in radial sealing contact with the in particular hollow-cylindrical first valve seat VS1. In the open position the first seal D1 is moved out of the first receptacle space transition section 46a and is within the first connecting main section 45b having a larger diameter, so that the working fluid can flow past.

The design of the second control structure SS2 as a poppet valve structure offers the advantage that any pressure peaks resulting from an abrupt deceleration of a first or second output movement 28a, 28b of the output member 29 push the second seal D2 against the axially oriented second valve seat VS2, so that the sealing action is intensified and the valve member 13 14 is at the same time supported by the valve housing 11, 12. The design of the second control structure SS2 as a poppet valve structure combined in this respect advantageously avoids over-determination, because the poppet valve structure can ensure a secure sealing action irrespective of certain axial tolerances.

Notwithstanding the illustrated advantageous combination of a poppet valve structure with a spool valve structure, it is quite possible to design both control structures SS1, SS2 either as poppet valve structures or as spool valve structures in each safety valve V1, V2.

Some possible operating modes and operating states of the safety valve device 6 are described below with reference to the appended figures.

Figure 1:
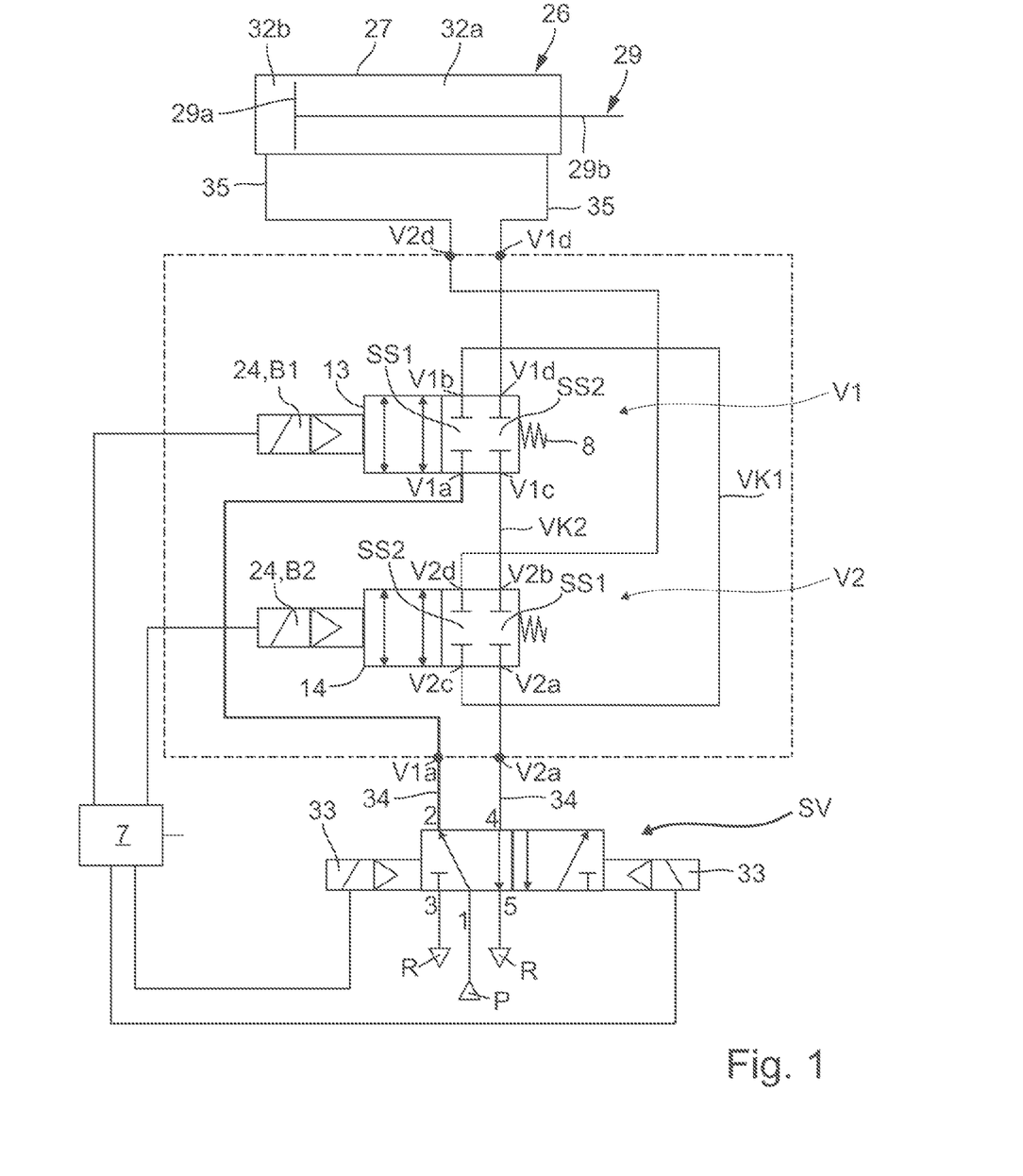
FIG. 1 shows in a diagrammatic illustration a preferred embodiment of the safety valve device according to the invention as a circuit, wherein the two safety valves are shown in a first switching state conceived as inoperative position, where a control valve is connected to the inlet side and a fluid-actuated drive to be activated is connected to the outlet side of the two safety valves, wherein there is further formed an electronic control unit designed for the activation of the safety valves and the control valve, wherein a preferred combination of the two safety valves to form a safety valve unit is further illustrated by a dot-dash rectangular frame.

FIG. 1 and FIG. 2 show a first operating state which can be described as default state, in which the control valve SV is in the first switching position and the two safety valves V1, V2 are in their first switching state corresponding to the inoperative state because of deactivated actuating devices B1, B2. The first switching state is equivalent to the closed position of the valve members 13, 14 of both safety valves V1, V2. Since the second control structure SS2 of both safety valves V1, V2 is closed, the two outlet ports V1d, V2d are blocked and the volume in the two drive chambers 32a, 32b of the drive 26 is locked in. The output member 29 therefore cannot move. Although the drive fluid from the pressure source P can flow through the control valve SV from the first working passage 2 to the inlet port V1a of the first safety valve V1, it is stopped there by virtue of the closed first control structure SS1 and the inlet port V1a blocked as a result, so that no action can develop with respect to the drive 29.

Figure 3:
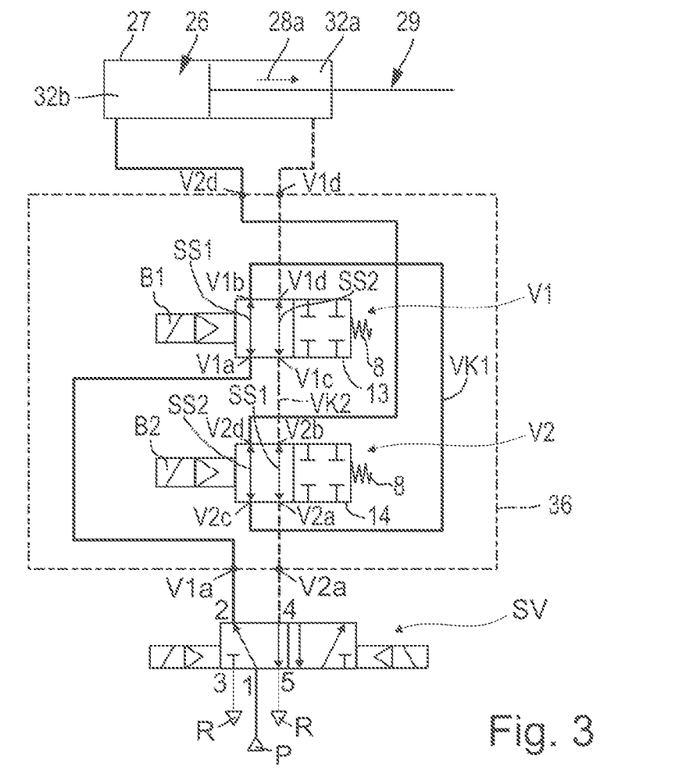
FIG. 3 shows the circuit from FIG. 1 without the electronic control unit in an operating state with both safety valves being in a second switching state, an output member of the connected drive being driven to perform a first output movement.

FIG. 3 and FIG. 4 show a second operating state which differs from the first operating state to the effect that both safety valves V1, V2 occupy the second switching state, their valve members 13, 14 being in the open position. In this case the outlet port V2d and thus the second drive chamber 32b connected thereto are connected to the pressure source P, namely through the open second control structure SS2 of the second safety valve V2 and the likewise open first control structure SS1 of the first safety valve V1. At the same time the outlet port V1d and thus the first drive chamber 32a connected thereto are vented to the pressure sink R through the open second control structure SS2 of the first safety valve V1 and the open first control structure SS1 of the second safety valve V2. In FIG. 3 the components to which pressure is applied are indicated by a thickened line and the relieved components by a broken line. In FIG. 4 the ventilation flow is indicated by the flow arrow 53 and the venting flow by the flow arrow 54. As a result of the second operating state the output member 29 performs a first output movement 28a from the first stroke end position occupied in the first operating state to a second stroke end position. As long as the second operating state is maintained, the output part 29 is then held in the second stroke end position.

Figure 5:
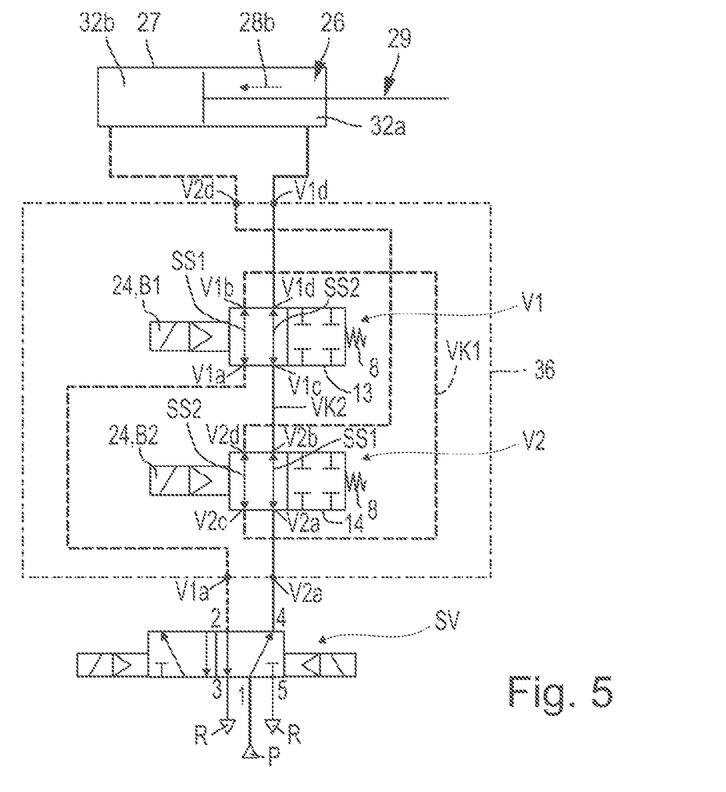
FIG. 5 shows the circuit from FIG. 1 and FIG. 3 with the safety valves still occupying the second switching state, wherein the control valve connected to the inlet side is switched into a second switching position, wherein the output member of the drive is driven to perform a second output movement opposed to the first output movement.

FIG. 5 and FIG. 6 show a third operating state in which the two safety valves V1, V2 are still in the second switching state, but the control valve SV is switched into the second switching position. As a result the first drive chamber 32a is ventilated while the second drive chamber 32b is vented at the same time, so that the output member 29 performs a second output movement 28b ending on reaching the first stroke end position. As long as the third operating state prevails, the output member is held in the first stroke end position. The ventilation flow 53 and the venting flow 54 are once again indicated in FIG. 6 by flow arrows.

The first, second and third operating states are correct, proper operating states of the safety valve device 6.

Figure 7:
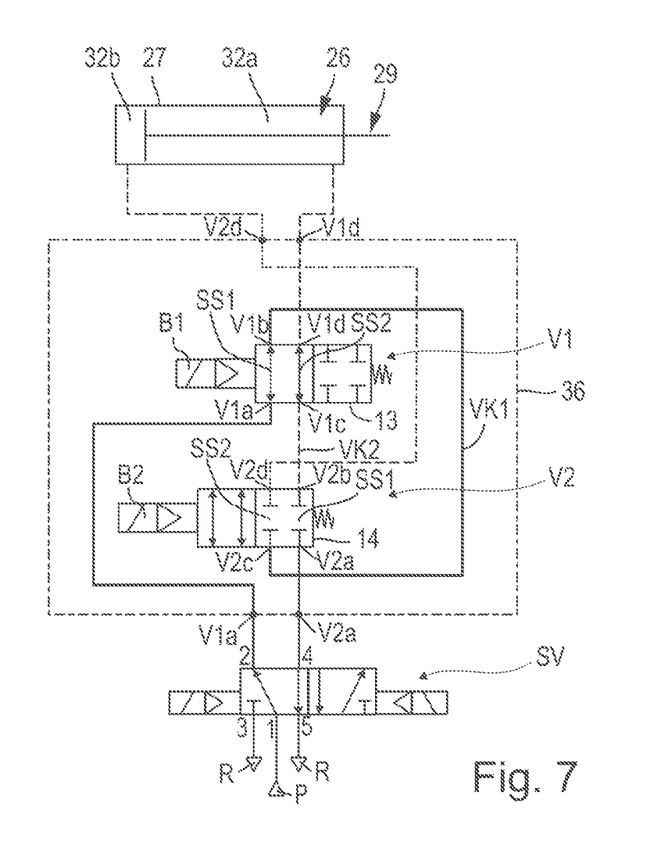
FIG. 7 shows the circuit of FIG. 1, FIG. 3 and FIG. 5, wherein the control valve is in the first switching position and wherein the first safety valve is in the second switching state and the second safety valve is in the first switching state because of a fault situation.
Figure 8:
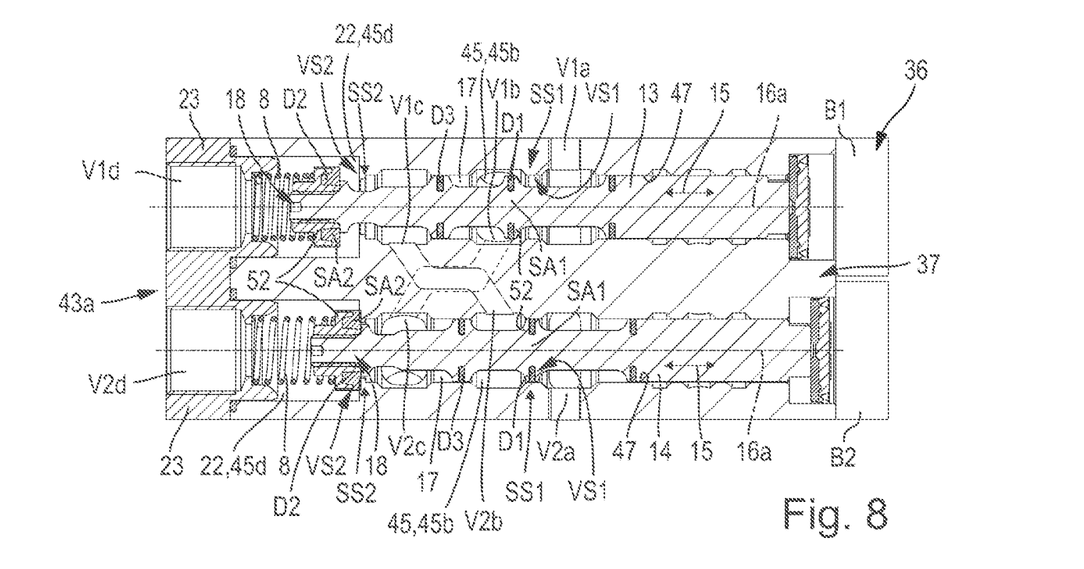
FIG. 8 shows the safety valve unit of FIG. 2, FIG. 4 and FIG. 6 with the safety valves in the switching state corresponding to FIG. 7.

FIG. 7 and FIG. 8 show a fourth operating state with a first fault case of the safety valves V1, V2, manifested by the fact that the first safety valve V1 is in the second switching state and the second safety valve V2 is in the first switching state.

The two safety valves V1, V2 are basically always activated by the electronic control unit 7 in such a way that they change their switching state simultaneously, a correct operation being manifested by the fact that both safety valves V1, V2 are in the first or the second switching state at the same time. In the first fault case shown in FIG. 7 and FIG. 8 the valve member 13, 14 of one of the two safety valves V1, V2 has remained in position, so that the switching state of the associated safety valve V1, V2 has not changed. This may have happened when switching from the closed position to the open position or when switching back from the open position to the closed position. Although the drive fluid emerging at the first working passage 2 can flow through the open first control structure SS1 of the first safety valve V1, it is stopped by the closed second control structure SS2 and the likewise closed second connecting port V2c of the second safety valve V2, so that it does not act on the part of the drive 26. The output member 29 is held immobile since both drive chambers 32a, 32b are blocked. The first drive chamber 32a is blocked at the first connecting port V2b of the second safety valve V2, and the second drive chamber 32b is blocked at the outlet port V2d of the second safety valve V2.

Figure 9:
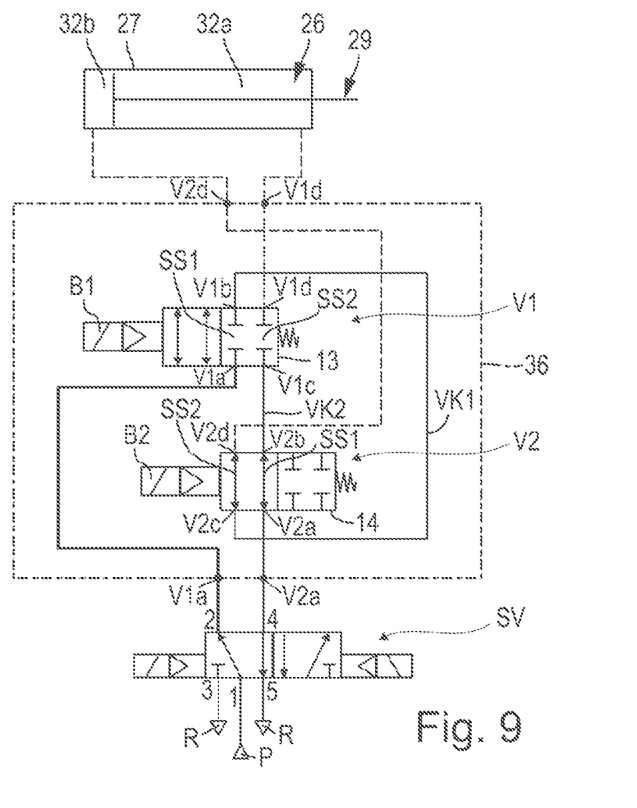
FIG. 9 shows the circuit of FIG. 1, FIG. 3, FIG. 5 and FIG. 7 with the same switching position of the control valve as in FIG. 7, illustrating a fault situation in which the first safety valve is in the second switching state and the second safety valve is in the first switching state.
Figure 10:
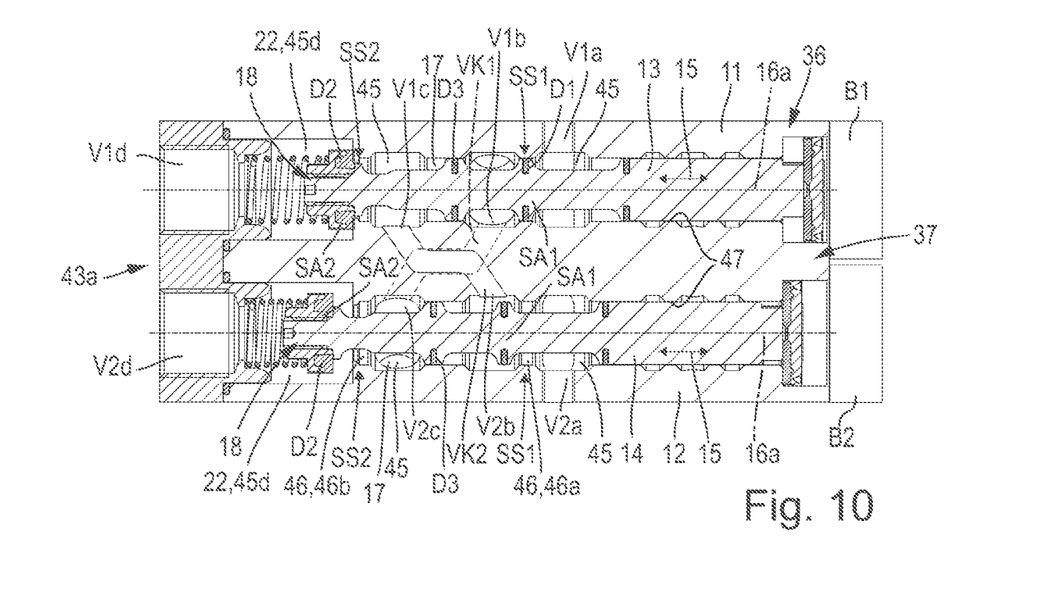
FIG. 10 shows the safety valve unit of FIG. 2, FIG. 4, FIG. 6 and FIG. 8 with the safety valves in the switching state corresponding to the circuit of FIG. 9.

FIG. 9 and FIG. 10 show a fifth operating state with a second fault case in which, in analogy to the first fault case, the two safety valves V1, V2 have different switching states, the first switching state prevailing in the first safety valve V1 and the second first switching state prevailing in the second safety valve V2, however. The working fluid at the first working passage 2 is stopped by the blocked inlet port V1a of the first safety valve V1. At the same time both drive chambers 32a, 32b are blocked, so that the output member 29 can no longer move. The first drive chamber 32a is blocked by the blocked outlet port V1d of the first safety valve V1 and the second drive chamber 32b is blocked by the blocked outlet port V2d of the second safety valve V2.

Figure 11:
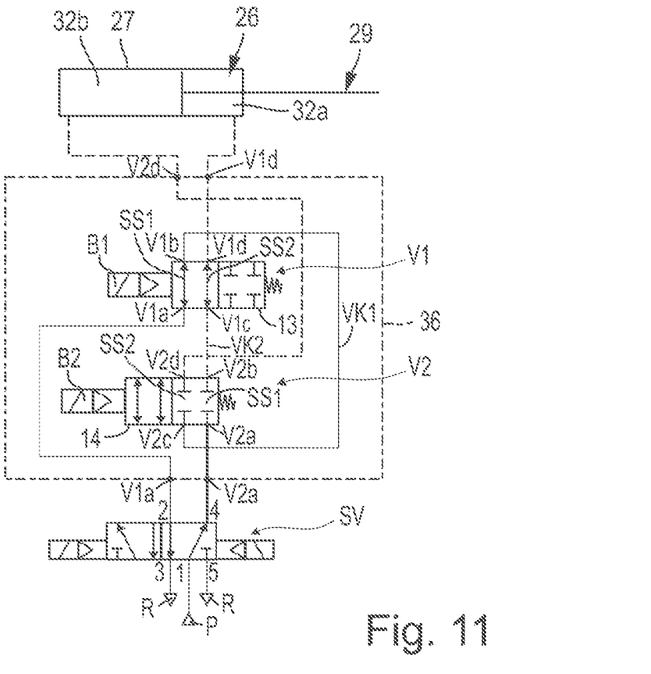
FIG. 11 shows the circuit of FIG. 1, FIG. 3, FIG. 5, FIG. 7 and FIG. 9 in a fault condition of the safety valves corresponding to FIG. 7, the control valve being in the second switching position.

FIG. 11 shows a sixth operating state with the first fault case of the safety valves V1, V2 already explained with reference to FIG. 7 and FIG. 8, the only difference to the fourth operating state being that the control valve VS is in the second switching position. The two drive chambers 32a, 32b are blocked in the same way as in the fourth operating state of FIG. 7 and FIG. 8, and only the inlet-side blocking of the drive fluid has changed by the fact that the second working passage 4 connected to the pressure source P is blocked by the inlet port V2a of the first safety valve V1.

Figure 12:
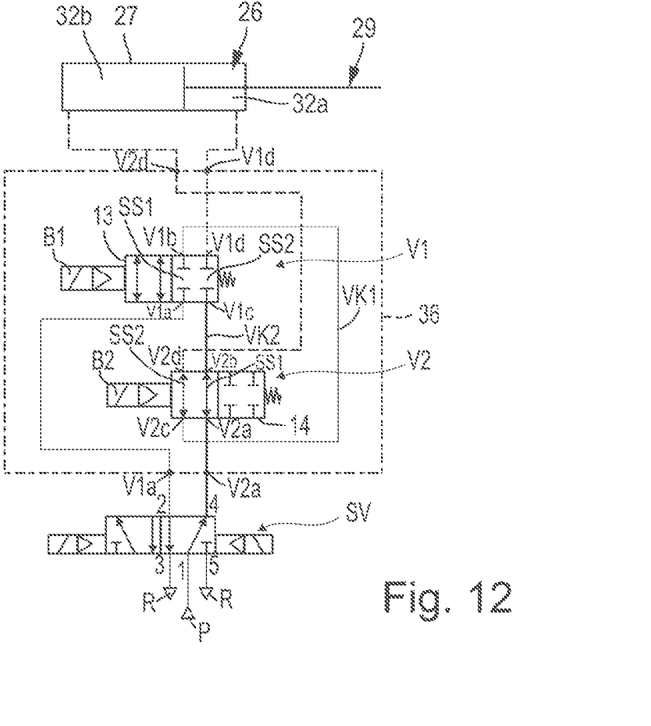
FIG. 12 shows the circuit of FIG. 1, FIG. 3, FIG. 5, FIG. 7, FIG. 9 and FIG. 11 in a fault condition of the two safety valves corresponding to FIG. 9, the control valve being in the second switching position.

In the seventh operating state illustrated in FIG. 12 the second fault case is present in analogy to the fifth operating state, the two drive chambers 32a, 32b being blocked correspondingly. The only difference to the fourth operating state is the different blocking of the drive fluid supplied at the inlet, which in this case happens at the second working passage 4 of the control valve SV. The second working passage 4 is blocked by the closed second connecting port V1c of the first safety valve V1.

By means of the interconnection of the connecting passages VK1, VK2 described above, which is designed as a cross-over circuit in particular, combined with the described arrangement of the outlet ports V1d, V2d leading to the drive 26, a so-called single-fault safety concept can be realised. Irrespective of which of the dynamic seals provided should fail, the safety function always remains ensured, that is to say the working fluid remains blocked at the outlet.

The invention claimed is:

1. A safety valve device, comprising: a first safety valve and a second safety valve fluidically interconnected with the first safety valve, wherein each of the first and second safety valves has an actuating device, by means of which it can optionally be moved into a first switching state or a second switching state,
wherein each of the first and second safety valves have a 4/2-way valve function, each of them having four valve ports, these being an inlet port designed for fluidic connection to a control valve controlling the feed and discharge of a working fluid, an outlet port designed for fluidic connection to a double-acting, fluid-actuated drive, and a first connecting port as well as a second connecting port, wherein the first connecting port of the first safety valve is fluidically connected to the second connecting port of the second safety valve and the first connecting port of the second safety valve is fluidically connected to the second connecting port of the first safety valve,
wherein each of the first and second safety valves has a valve housing in which is formed a valve member receptacle space extending in a longitudinal direction along a longitudinal axis, in which receptacle space a valve member movable between a closed position defining the first switching state and an open position defining the second switching state while performing a switchover movement in the longitudinal direction is located,
wherein in each of the first and second safety valves each of the four valve ports are disconnected from one another in a fluid-tight manner in the closed position of the valve member and the inlet port is fluidically connected to the first connecting port and the second connecting port is fluidically connected to the outlet port in the open position of the valve member,
wherein each of the first and second safety valves has a first control structure for optionally blocking or enabling a fluid connection between the inlet port and the first connecting port and a second control structure located at a distance from the first control structure in the longitudinal direction for optionally blocking or enabling a fluid connection between the second connecting port and the outlet port,
wherein each first control structure has a first control section formed at the valve member of the associated one of the first and second safety valves and having an annular first seal as well as an annular first valve seat formed at the valve housing, and wherein each second control structure has a second control section formed at the valve member of the associated one of the first and second safety valves and having an annular second seal as well as an annular second valve seat formed at the valve housing,
wherein each valve member bears in its closed position with the first seal against the first valve seat and with the second seal against the second valve seat while forming a seal, and
wherein each valve member is in its open position removed with the first seal from the first valve seat and with the second seal from the second valve seat, in each case opening up a flow cross-section, wherein the second control section having the second seal is in each valve member a part of an axial outlet end section of the valve member which, in the open position of the valve member, extends, without sealing contact to the valve housing, into a receptacle space end section of the valve member receptacle space and terminates in said receptacle space end section, the outlet port opening out into the receptacle space end section.

2. The safety valve device according to claim 1, wherein the first and second safety valves are each of a monostable design, each having a return spring preloading the valve member into the closed position.

3. The safety valve device according to claim 2, wherein the return spring is located in the receptacle space end section of the valve member receptacle space and is supported there at the valve member at one end and at the valve housing at the other end.

4. The safety valve device according to claim 1, wherein each outlet port terminates axially into the associated receptacle space end section in coaxial orientation with respect to the longitudinal axis.

5. The safety valve device according to claim 1, wherein the actuating device of each of the first and second safety valves is of an electrically actuable design.

6. The safety valve device according to claim 1, wherein the actuating device of each of the first and second safety valves is designed as an electrically actuable pilot valve device.

7. The safety valve device according to claim 1, wherein at least the second control structure is designed as a poppet valve structure with the second valve seat being axially oriented which faces the receptacle space end section and against which the associated second seal of the second control section bears in the closed position of the valve member.

8. The safety valve device according to claim 1, wherein the first control structure is designed as a spool valve structure with the first valve seat oriented radially inwards with respect to the longitudinal axis of the valve member receptacle space and against which the associated first seal of the first control section bears radially in the closed position of the valve member.

9. The safety valve device according to claim 1, wherein in each of the first and second safety valves the valve member receptacle space is bounded by a peripheral receptacle space boundary surface of the valve housing radially on the outside and is divided into several receptacle space main sections arranged consecutively in the longitudinal direction at a distance from one another and several receptacle space transition sections, each located between two longitudinally consecutive receptacle space main sections and having a smaller cross-section than the receptacle space main sections, wherein the first valve seat is located at a first receptacle space transition section and the second valve seat is formed at a second receptacle space transition section and wherein a receptacle space main section adjoining the second receptacle space transition section forms the receptacle space end section.

10. The safety valve device according to claim 9, wherein in each of the first and second safety valves the receptacle space main sections have an inlet main section, a subsequent first connecting main section, a subsequent second connecting main section and a subsequent outlet main section represented by the receptacle space end section,
wherein the first receptacle space transition section is located between the inlet main section and the first connecting main section and the second receptacle space transition section is located between the second connecting main section and the outlet main section,
wherein the inlet port terminates into the inlet main section, the first connecting port into the first connecting main section, the second connecting port into the second connecting main section and the outlet port into the outlet main section, and
wherein a third receptacle space transition section is located between the first connecting main section and the second connecting main section, which third receptacle space transition section is always closed by the valve member irrespective of its switching position, so that the first connecting main section and the second connecting main section are always disconnected from each other.

11. The safety valve device according to claim 10, wherein the third receptacle space transition section is radially outside bounded by a hollow-cylindrical surface section of the peripheral receptacle space boundary surface of the valve housing, against which the valve member always bears with an annular third seal in sealing contact in a slidable manner.

12. The safety valve device according to claim 10, wherein the inlet main section is sealed dynamically at the outside axially opposite the first receptacle space transition section by means of a dynamic sealing arrangement realised between the valve member and the valve housing independently of switching position, in particular by providing that the valve member bears with an annular end seal against a hollow-cylindrical surface section of the peripheral receptacle space boundary surface in a slidable manner.

13. The safety valve device according to claim 1, wherein the first and second safety valves are combined to form a safety valve unit capable of uniform handling, which has a valve housing unit which forms the valve housings of the first and second safety valves and in which all valve ports of the two safety valves are formed.

14. The safety valve device according to claim 13, wherein the first and second safety valves are placed next to each other longitudinally and oriented such that their receptacle space end sections point into the same axial direction.

15. The safety valve device according to claim 13, wherein a first connecting passage connecting the first connecting port of the first safety valve to the second connecting port of the second safety valve and a second connecting passage connecting the second connecting port of the first safety valve to the first connecting port of the second safety valve are formed in the valve housing unit.

16. The safety valve device according to claim 1, further comprising a control valve, which is designed as a 5/2-way valve and has a first working passage connected to the inlet port of the first safety valve and a second working passage connected to the inlet port of the second safety valve, and which further has a feed passage connected to a pressure source supplying the working fluid and two vent passages connected to a pressure sink.

17. The safety valve device according to claim 1, further comprising an electronic control unit connected to the actuating devices of the first and second safety valves for predetermining the respective switching state of the two safety valves.

* * * * *